US012103328B1

(12) United States Patent
Zhu

(10) Patent No.: US 12,103,328 B1
(45) Date of Patent: Oct. 1, 2024

(54) FOLDABLE CLIPBOARD

(71) Applicant: Jianren Zhu, Zhaoqing (CN)

(72) Inventor: Jianren Zhu, Zhaoqing (CN)

( * ) Notice: Subject to any disclaimer, the term of this patent is extended or adjusted under 35 U.S.C. 154(b) by 0 days.

(21) Appl. No.: 18/465,024

(22) Filed: Sep. 11, 2023

(51) Int. Cl.
*B42F 9/00* (2006.01)
*B42F 1/02* (2006.01)

(52) U.S. Cl.
CPC ................ *B42F 9/001* (2013.01); *B42F 1/02* (2013.01)

(58) Field of Classification Search
CPC ............... B42F 1/02; B42F 9/001; B42L 5/02
See application file for complete search history.

(56) References Cited

U.S. PATENT DOCUMENTS 6,213,439 B1 * 4/2001 Giulie .................... A47B 97/04 248/459
D611,544 S * 3/2010 Liptan ............................ D19/88
2007/0187565 A1 * 8/2007 Liptan ..................... B42F 9/001 248/456
2023/0087799 A1 * 3/2023 Khaliq .................... B42F 9/002 281/45
2023/0106163 A1 * 4/2023 Khaliq .................... B42F 9/001 281/49

FOREIGN PATENT DOCUMENTS

JP 3148952 U * 3/2009
JP 2020006674 A * 1/2020

OTHER PUBLICATIONS

JP-3148952-U English Translation (Year: 2009).*

* cited by examiner

*Primary Examiner* — Kyle R Grabowski

(57) ABSTRACT

A multi-foldable clipboard is disclosed, including a first panel, a second panel, a third panel, and a fourth panel. The first panel is configured with a clamping means for clamping paper, the first panel is configured to be hinged with the second panel via a first hinged part, the second panel is configured to be hinged with the third panel via a second hinged part, and the third panel is configured to be hinged with the fourth panel via a third hinged part. The first hinged part is disposed on both side edges of the first panel and protrudes from an upper surface of the first panel. With the cooperation of the first panel, the second panel, the third panel and the fourth panel, the multi-foldable clipboard can achieve a small storage volume while ensuring a larger unfolding size, thus improving use experience.

7 Claims, 5 Drawing Sheets

FOLDABLE CLIPBOARD

TECHNICAL FIELD

The present application relates to the technical field of writing boards, and specifically to a multi-foldable clipboard.

BACKGROUND

Clipboard is a type of stationery used to record text, commonly used in a variety of services or educational work environment. At present, the clipboard on the market is generally a flat-plate, which cannot be folded and is not convenient to carry. After recording data, users still need to hold the clipboard, which makes it difficult for both hands to carry out other work, thus affecting the user experience, and also it is not easy to block a written text to achieve the purpose of confidentiality.

Later, there are some able to fold the clipboard, through folding of the clipboard to make a volume of the clipboard to reduce, so as to facilitate the storage. However, the clipboard on the market may only be folded twice, which makes a storage volume is not small enough to place, the storage is not convenient. And when folded, a gap between the boards is too small, resulting in serious wrinkles in a paper held on the clipboard, and meanwhile a size of the clipboard is too small after unfolded, so that the user's writing range is limited, thus bringing inconvenience in use.

SUMMARY

An objective of the present disclosure is to provide a novelty multi-foldable clipboard to address problems of inconvenient use of the current clipboard.

Specifically, the present disclosure adopts following technical solutions to realize the above objective.

In some embodiments, a multi-foldable clipboard is provided, including a first panel, a second panel, a third panel, and a fourth panel. The first panel is configured with a clamping means for clamping paper, the first panel is configured to be hinged with the second panel via a first hinged part, the second panel is configured to be hinged with the third panel via a second hinged part, and the third panel is configured to be hinged with the fourth panel via a third hinged part. The first hinged part is disposed on both side edges of the first panel and protrudes from an upper surface of the first panel, the second hinged part is disposed on both side edges of the second panel and protrudes from an upper surface of the second panel, and the third hinged part is disposed on both side edges of the third panel and protrudes from an upper surface of the third panel.

In some other embodiments, the first hinged part includes a first hinged piece, a second hinged piece and a first hinged shaft. The first hinged piece is disposed on the both side edges of the first panel and located below the first panel, the second hinged piece is disposed on the both side edges of the second panel and located on the second panel. The first hinged piece is configured perpendicular to the first panel and extending forwardly, the second hinged piece is configured perpendicular to the second panel and extending forwardly, and the first hinged piece and the second hinged piece are configured to be hinged via the first hinged shaft.

In some other embodiments, the first hinged piece and the second hinged piece are configured with rounded corners on edges, the first hinged piece is configured with first hinged holes on an end of the first hinged piece away from the first panel, and the first hinged shaft is disposed in the first hinged holes.

In some other embodiments, the second hinged part includes a third hinged piece, a fourth hinged piece and a second hinged shaft. The third hinged piece is disposed on the both side edges of the second panel and located below the second panel, the fourth hinged piece is disposed on the both side edges of the third panel and located on the third panel, the third hinged piece is configured perpendicular to the second panel and extending forwardly, the fourth hinged piece is configured perpendicular to the third panel and extending forwardly, and the third hinged piece and the fourth hinged piece are configured to be hinged via the second hinged shaft.

In some other embodiments, the third hinged piece and the fourth hinged piece are configured with rounded corners on edges, the third hinged piece is configured with second hinged holes on an end of the third hinged piece away from the second panel, and the second hinged shaft is disposed in the second hinged holes.

In some other embodiments, the third hinged part includes a fifth hinged piece, a sixth hinged piece and a third hinged shaft. The fifth hinged piece is disposed on the both side edges of the third panel and located below the third panel, the sixth hinged piece is disposed on both side edges of the fourth panel and located on the fourth panel. The fifth hinged piece is configured perpendicular to the third panel and extending forwardly, the sixth hinged piece is configured perpendicular to the fourth panel and extending forwardly, and the fifth hinged piece is configured to be hinged with the six hinged piece via the third hinged shaft.

In some other embodiments, the fifth hinged piece and the sixth hinged piece are configured with rounded corners on edges, the fifth hinged piece is configured with third hinged holes on an end of the fifth hinged piece away from the third panel, and the third hinged shaft is disposed in the third hinged holes.

In some other embodiments, the first panel and the second panel have the same height, the third and fourth panels have the same height, and the third panel has a greater height than that of the second panel.

The present disclosure has at least following technical advantages. The multi-foldable clipboard provided by the present disclosure, due to provided with four panels, it can improve an unfolding area of the clipboard while minimizing a folded volume, which solves the problem of clipboard storage and can make the folded clipboard easily put into a clothing pocket. By sequential folding of the first panel, the second panel and the third panel, in actual use, no matter what the content of the first panel, the second panel or the third panel, the first panel, the second panel and the third panel can be folded after a completion of writing, preventing a written content from being seen by others, thereby can greatly increase privacy of users. And meanwhile, by setting the first hinged part protruding from the upper surface of the first panel, the second hinged part protruding from the upper surface of the second panel, and the third hinged part protruding from the upper surface of the third panel, so as to maintain a moving distance between adjacent panels after folded, which can effectively avoid excessive folding of the paper after folded, and also can solve the problem of serious folding of the paper, thereby improving the convenience of use and significantly improving user experience.

Figure 1:
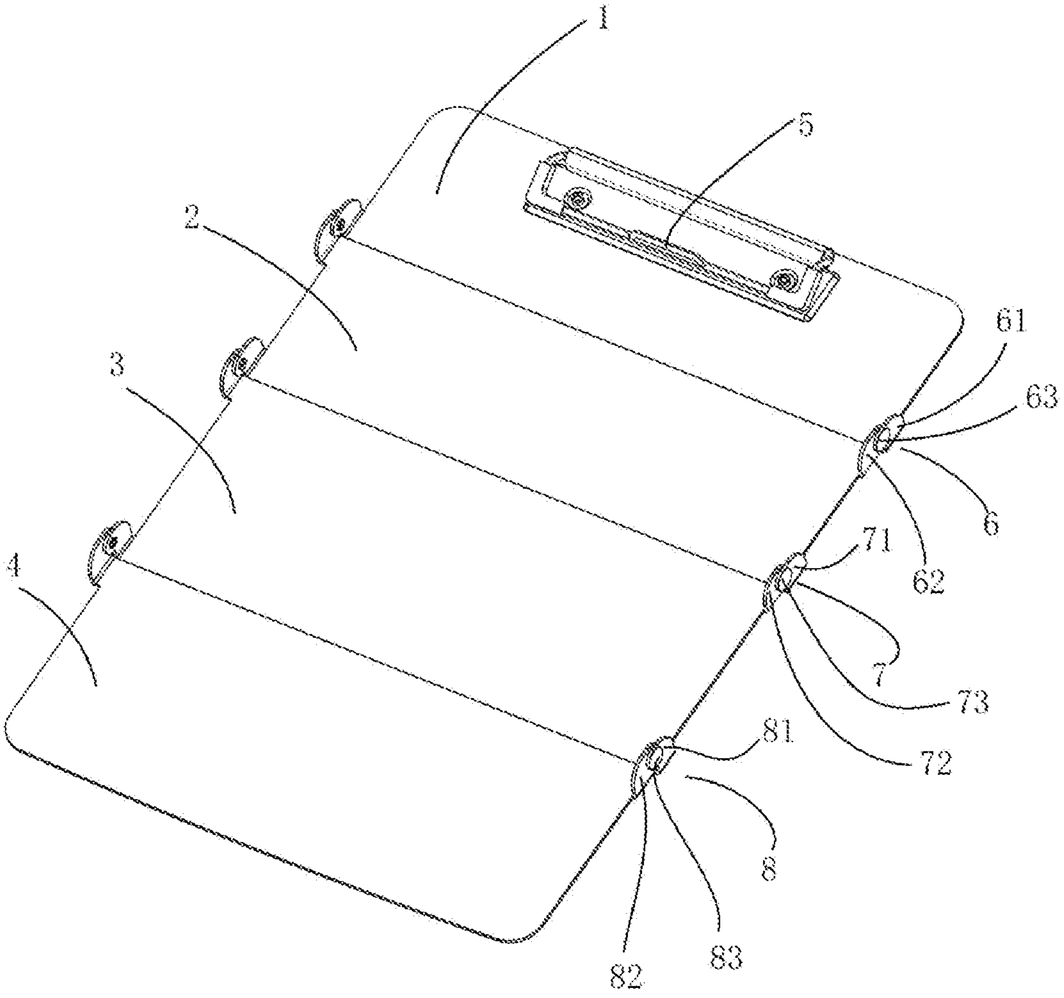
FIG. 1 shows a schematic structural diagram (in three dimensions) in an unfolded state of a multi-foldable clipboard in accordance with some embodiments of the present disclosure.

In the drawings, the reference signs are as follows.

1. first panel, 2. second panel, 3. third panel, 4. fourth panel, 5. clamping means, 6. first hinged part, 61. first hinged piece, 62. second hinged piece, 63. first hinged shaft, 64. first hinged hole, 7. second hinged part, 71. third hinged piece, 72. fourth hinged piece, 73. second hinged shaft, 74. second hinged hole, 8. third hinged part, 81. fifth hinged piece, 82. sixth hinged piece, 83. third hinged shaft, 84. third hinged hole.

DETAILED DESCRIPTION OF THE EMBODIMENTS

The technical solutions in the embodiments of the present disclosure will be clearly and completely described below in conjunction with the accompanying drawings in the embodiments of the present disclosure.

In the embodiments of the present disclosure, through the cooperation of the first panel, the second panel, the third panel and the fourth panel, a larger expansion size is guaranteed while a smaller storage volume is achieved, thus improving the use experience.

Referring to FIG. 1 to FIG. 5, in some embodiments a novelty multi-foldable clipboard is provided, including a first panel 1, a second panel 2, a third panel 3 and a fourth panel 4. The first panel 1 is configured with a clamping means 5, by which the clamping means 5 is used to clamp paper, thus play a role in fixing the paper and can ensure smooth writing. The first panel 1, the second panel 2, the third panel 3 and the fourth panel 4 are disposed up and down, the first panel 1 and the second panel 2 are hingedly connected by a first hinged part 6, the second panel 2 and the third panel 3 are hingedly connected by a second hinged part 7, the third panel 3 and the fourth panel 4 are hingedly connected by a third hinged part 8. And meanwhile, the first hinged part 6 is provided on both side edges of the first panel 1 and protrudes from an upper surface of the first panel 1, the second hinged part 7 is provided on both side edges of the second panel 2 and protrudes from an upper surface of the second panel 2, the third hinged part 8 is provided on both side edges of the third panel 3 and protrudes from an upper surface of the third panel.

By the above setting, duo to provision of four panels, an improvement of the unfolding area of the clipboard is made and while the minimization of the folded volume is achieved, which solves the storage problem of the clipboard and makes the folded clipboard can be easily put into a clothing pocket. By folding the first panel 1, the second panel 2 and the third panel 3 in sequence, in actual use, no matter what content of the first panel 1, the second panel 2 and the third panel 3, the second panel and the third panel can be folded after a completion of writing, preventing a written content from being seen by others, thereby can greatly increase privacy of users. Meanwhile, by setting the first hinged part 6 protruding from the upper surface of the first panel 1, the second hinged part 7 protruding from the upper surface of the second panel 2, and the third hinged part 8 protruding from the upper surface of the third panel 3, so as to maintain a moving distance between adjacent panels after folded, which can effectively avoid excessive folding of the paper after folded, and also can solve the problem of serious folding of the paper.

It should be noted that defining the clipboard up and down setting, a direction facing the clipboard in use is forward, and structures of the first hinged part 6, the second hinged part 7 and the second hinged part 7 are described in detail below.

Figure 2:
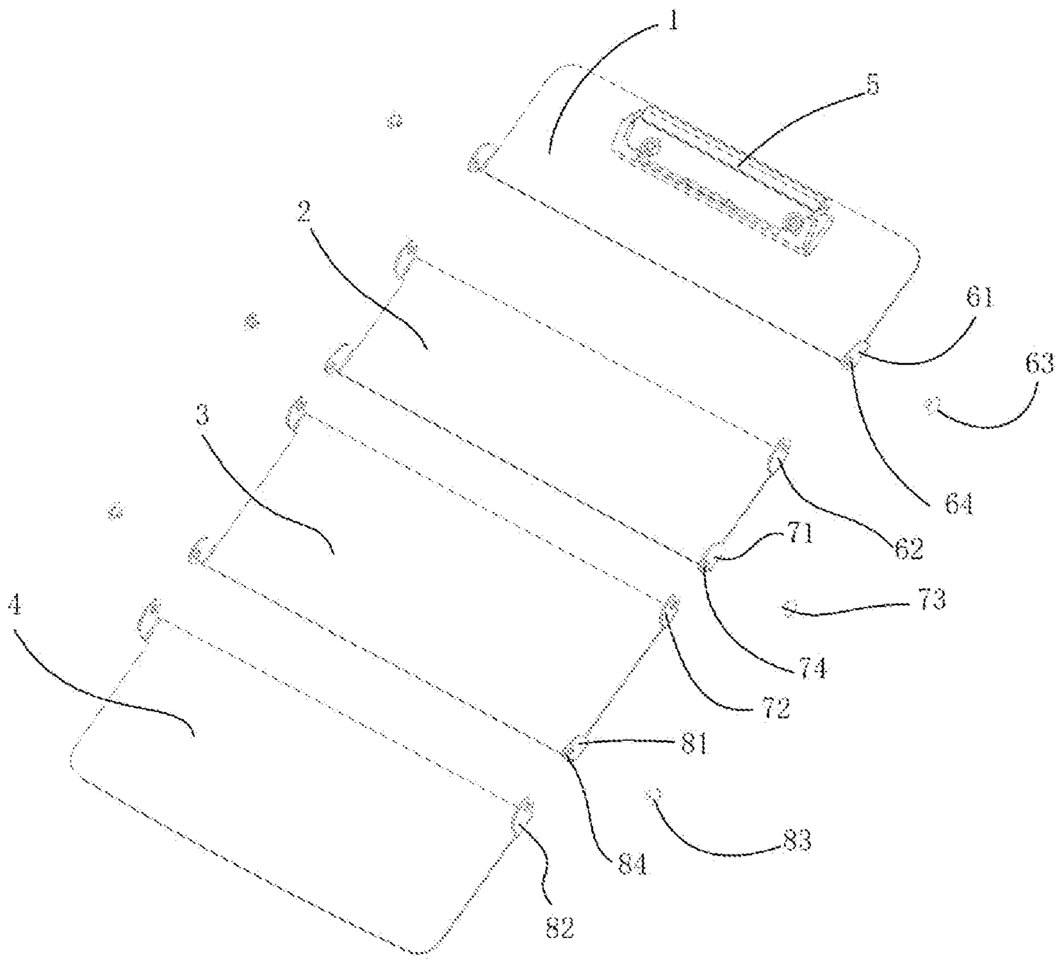
FIG. 2 shows a schematic structural diagram (in exploded view) in an unfolded state of a multi-foldable clipboard in accordance with some embodiments of the present disclosure.
Figure 3:
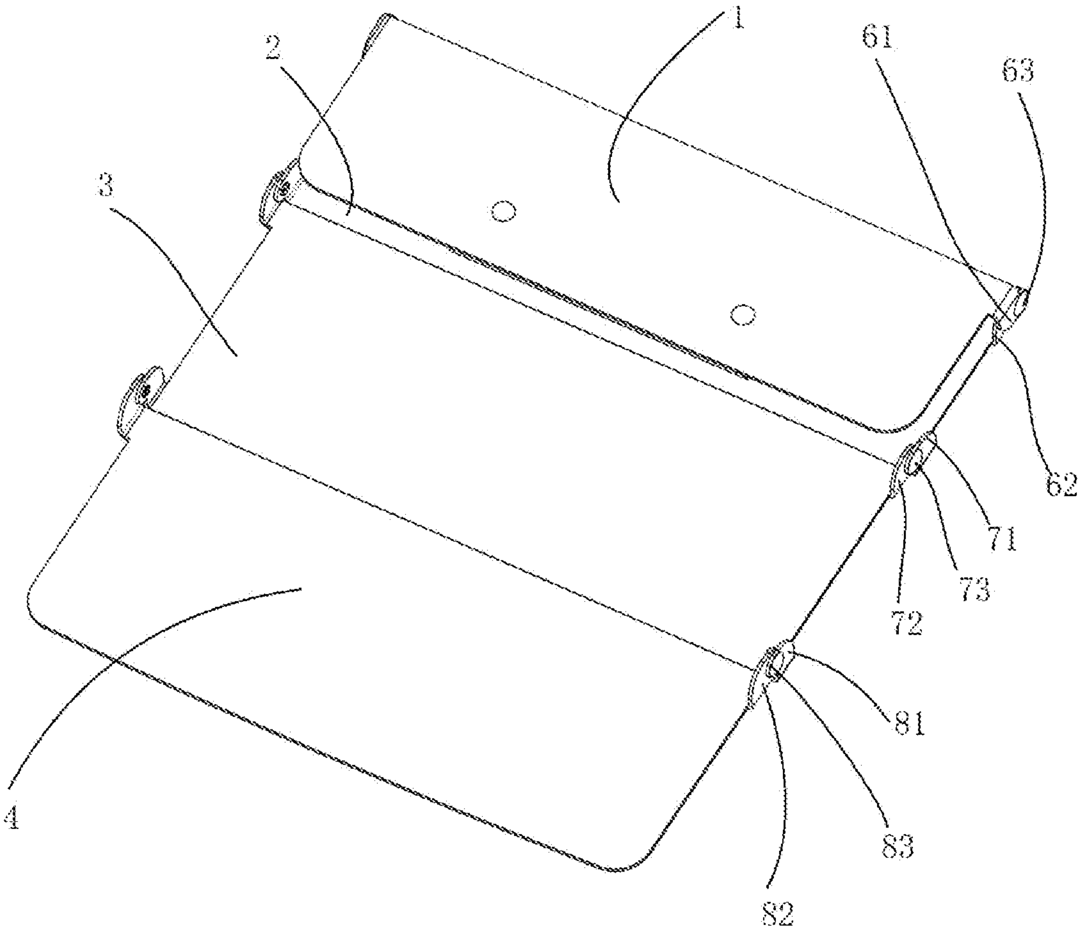
FIG. 3 shows a schematic structural diagram of the first panel of the multi-foldable clipboard after being folded down in accordance with some embodiments of the present disclosure.

Referring to FIG. 2 and FIG. 3, the first hinged part 6 includes a first hinged piece 61, a second hinged piece 62 and a first hinged shaft 63. The first hinged piece 61 is provided at the both side edges of the first panel 1 and located below the first panel 1, the second hinged piece 62 is provided at the both side edges of the second panel 2 and located on the second panel 2. Meanwhile, the second hinged piece 2 is provided on the second panel 2, and in order to maintain a certain distance between the first panel 1 and the second panel 2 after folded, the first hinged piece 61 is configured perpendicular to the second panel 1 and extending forwardly, the second hinged piece 62 is configured perpendicular to the second panel 2 and extending forwardly, the first hinged piece 61 and the second hinged piece 62 are configured to be hinged via the first hinged shaft 63. In an non-folded state, the first panel 1 and the second panel 2 are pressed against each other to keep the first panel 1 and the second panel 2 coplanar so that they can be used normally, and in a folded state, the first panel 1 is flipped over and the first panel 1 is stowed away. Due to a limiting action of the first hinged piece 61 and the second hinged piece 62, a certain distance is maintained between the first panel 1 and the second panel 2, so as to avoid excessive bending of the paper at the portion where the first panel 1 and the second panel 2 are hinged, which may lead to folding of the paper.

In some embodiments, the first hinged piece 61 and the second hinged piece 62 are configured with rounded corners on edges, thereby avoiding the first hinged piece 61 and the second hinged piece 62 from pinching the user, the first hinged piece 61 is configured with first hinged holes 64 on an end of the first hinged piece 61 away from the first panel 1, and the first hinged shaft 63 is disposed in the first hinged holes 64.

Figure 4:
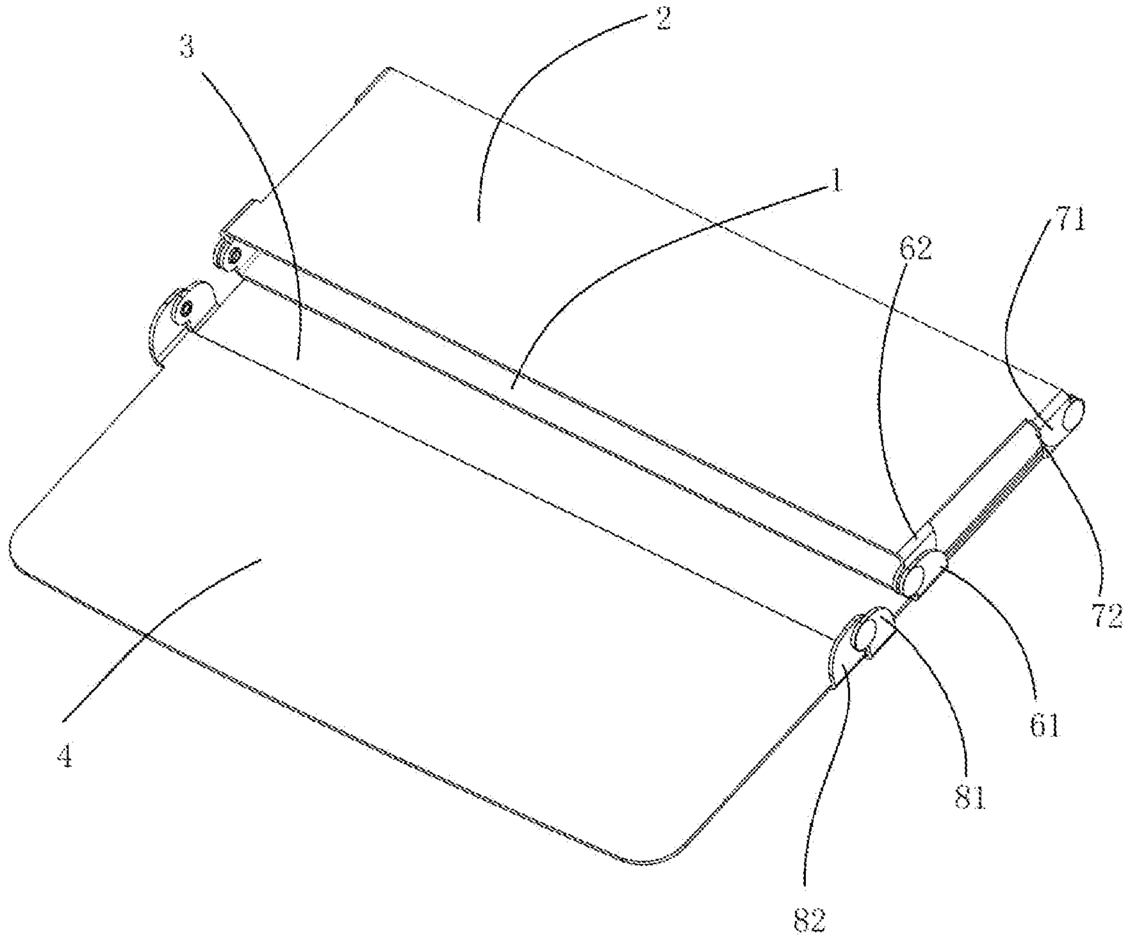
FIG. 4 shows a schematic structural diagram of the first panel and the second panel of the multi-foldable clipboard after being folded down in accordance with some embodiments of the present disclosure.

Referring to FIG. 2 and FIG. 4, the second hinged part 7 includes a third hinged piece 71, a fourth hinged piece 72 and a second hinged shaft 73. The third hinged piece 71 is disposed on the both side edges of the second panel 2 and located below the second panel 2, the fourth hinged piece 72 is disposed on the both side edges of the third panel 3 and located on the third panel 3. In order to maintain a certain distance between the second panel 2 and the third panel 3 after folded, the third hinged piece 71 is configured perpendicular to the second panel 2 and extending forwardly, the fourth hinged piece 72 is configured perpendicular to the third panel 3 and extending forwardly, the third hinged piece

71 and the fourth hinged piece 72 are configured to be hinged via the second hinged shaft 73. In the non-folded state, the second panel 2 and the third panel 3 are pressed against each other to keep the second panel 2 and the third panel 3 coplanar, so that they can be used normally. In the folded state, on the basis of the folding of the first panel 1, the second panel 2 is flipped over, the first panel 1 and the second panel 2 are stowed away. Due to a limiting action of the third hinged piece 71 and the fourth hinged piece 72, a certain distance is maintained between the second panel 2 and the third panel 3, so as to avoid excessive bending of the paper at the portion where the first panel 1 and the second panel 2 are hinged, which may lead to folding of the paper.

In some other embodiments, the third hinged piece 71 and the fourth hinged piece 72 are configured with rounded corners on edges, thereby avoiding the third hinged piece 71 and the fourth hinged piece 72 from pinching the user. The third hinged piece 71 is configured with second hinged holes 74 on an end of the third hinged piece 71 away from the second panel 2, and the second hinged shaft 73 is disposed in the second hinged holes 74.

Figure 5:
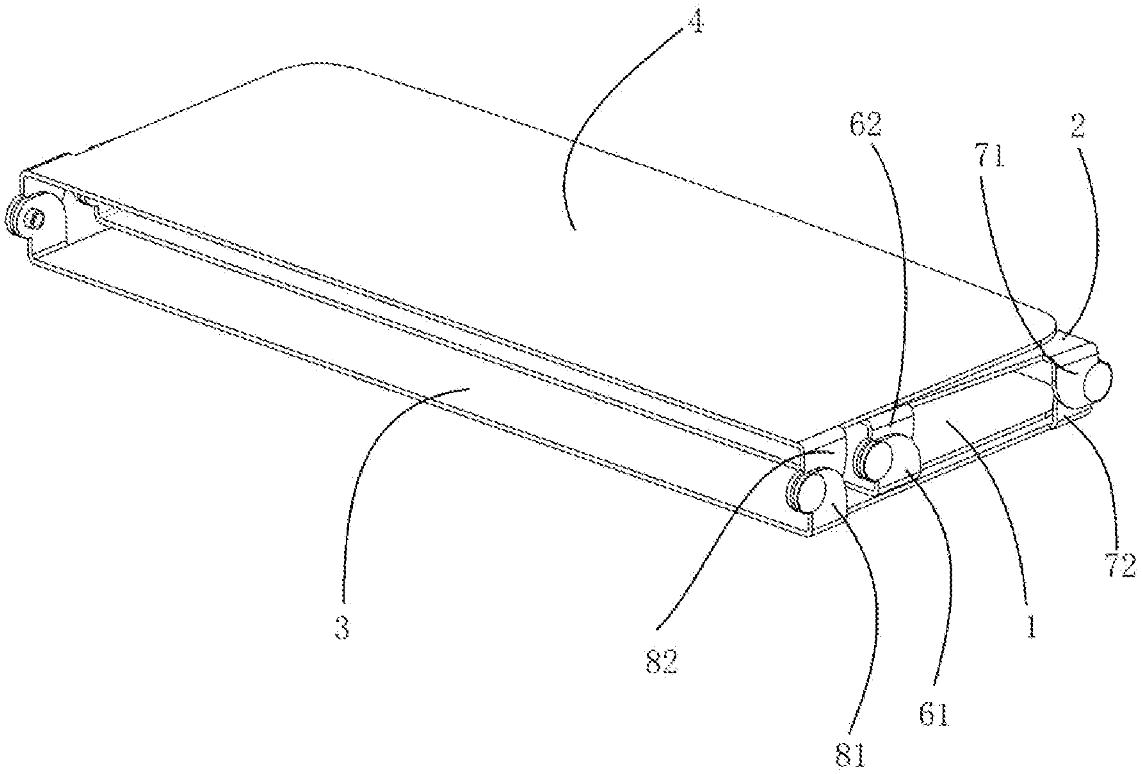
FIG. 5 shows a schematic structural diagram of a folded stowed state of the multi-foldable clipboard in accordance with some embodiments of the present disclosure.

Referring to FIG. 2 and FIG. 5, the third hinged part 8 includes a fifth hinged piece 81, a sixth hinged piece 82 and a third hinged shaft 83. The fifth hinged piece 81 is disposed on the both side edges of the third panel 3 and located below the third panel 3, the sixth hinged piece 82 is disposed on both side edges of the fourth panel 4 and located on the fourth panel 4. In order to maintain some distance between the third panel 3 and the fourth panel 4 after folded, the fifth hinged piece 81 is configured perpendicular to the third panel 3 and extending forwardly, the sixth hinged piece 82 is configured perpendicular to the fourth panel 4 and extending forwardly, and the fifth hinged piece 81 is configured to be hinged with the six hinged piece 82 via the third hinged shaft 83. In the non-folded state, the third panel 3 and the fourth panel 4 are pressed against each to keep the third panel 3 and the fourth panel 4 coplanar, so that they can be used normally. In the folded state, the fourth panel 4 is in contact with the second panel 2, the first panel 1 and the second panel 2 are sandwiched between the third panel 3 and the fourth panel 4. Due to a limiting action of the third hinged piece 71 and the fourth hinged piece 72, a certain distance is maintained between the second panel 2 and the third panel 3, so as to avoid excessive bending of the paper in the portion where the third panel 3 and the fourth panel 4 are hinged, resulting in folding of the paper, and at this time, a complete folding of the clipboard is also realized, and the third panel 3 and the fourth panel 4 play a role of protection of the paper after folded.

In some other embodiments, the fifth hinged piece 81 and the sixth hinged piece 82 are configured with rounded corners on edges, thereby avoiding the fifth hinged piece 81 and the sixth hinged piece 82 from pinching the user. The fifth hinged piece 81 is configured with third hinged holes 84 on an end of the fifth hinged piece 81 away from the third panel 3, and the third hinged shaft 83 is disposed in the third hinged holes 84.

In some other embodiments, the first panel 1 and the second panel 2 have the same height, the third panel 3 and the fourth panel 4 have the same height, so that the clipboard unfolded can match a size of a A4 paper, thereby easy to clamp the A4 paper. Meanwhile, a height of the third panel 3 is greater than a height of the second panel 2, which makes the first panel 1 and the second panel 2 completely stowed in the third panel 3 and the fourth panel 4 when folded for storage, and a size of the folded dimensions conforms to ergonomic dimensions, which makes it more convenient to hold, and even if in the hand for a long period of time, it will not cause fatigue of the palm.

The multi-foldable clipboard of the present disclosure is an improved upgrade to traditional flat, rigid writing boards and other known writing boards, it can be folded to suitable fit into, for example, but not limited to, suit or jacket pockets, lab coat pockets, backpack side pockets, pockets in standard jackets, pants pockets, handbags, and the like. Equally useful for doctors and medical staff, the multi-foldable clipboard of the present disclosure can be folded into four layers to fit comfortably into medical coat pockets, scrubs pockets, or even jeans pockets, and can be used to secure patient assessment forms, care plans, medication lists, and all documents to the clipboard, and also is designed to be folded for privacy. When corresponding to the paper content of the first panel, the second panel and the third panel, the content may be masked by folding, which is able to play a protective role in the service, confidentiality place, and within the scope of the embodiments, the multi-foldable clipboard can also be used to adapt to the needs of a variety of different requirements of various service or educational work environments, such as teachers, students, company staff, laboratory specialists, and so on.

Obviously, the described embodiments are only a part of the embodiments of the present disclosure, and not all of the embodiments. Based on the embodiments in the present disclosure, all other embodiments obtained by a person of ordinary skill in the art fall within the scope of protection of this invention.

What is claimed is:

1. A multi-foldable clipboard, comprising a first panel, a second panel, a third panel, and a fourth panel;

wherein the first panel is configured with a clamping means for clamping paper, the first panel is configured to be hinged with the second panel via a first hinged part, the second panel is configured to be hinged with the third panel via a second hinged part, and the third panel is configured to be hinged with the fourth panel via a third hinged part;

wherein the first hinged part is disposed on both side edges of the first panel and protrudes from an upper surface of the first panel, the second hinged part is disposed on both side edges of the second panel and protrudes from an upper surface of the second panel, and the third hinged part is disposed on both side edges of the third panel and protrudes from an upper surface of the third panel; and wherein the first panel and the second panel have the same height, the third panel and the fourth panel have the same height, and the third panel has a greater height than that of the second panel.

2. The multi-foldable clipboard according to claim 1, wherein the first hinged part comprises a first hinged piece, a second hinged piece and a first hinged shaft;

the first hinged piece is disposed on the both side edges of the first panel and located below the first panel, the second hinged piece is disposed on the both side edges of the second panel and located on the second panel; and the first hinged piece is configured perpendicular to the first panel and extending forwardly, the second hinged piece is configured perpendicular to the second panel and extending forwardly, and the first hinged piece and the second hinged piece are configured to be hinged via the first hinged shaft.

3. The multi-foldable clipboard according to claim 2, wherein the first hinged piece and the second hinged piece are configured with rounded corners on edges, the first hinged piece is configured with first hinged holes on an end of the first hinged piece away from the first panel, and the first hinged shaft is disposed in the first hinged holes.

4. The multi-foldable clipboard according to claim 1, wherein the second hinged part comprises a third hinged piece, a fourth hinged piece and a second hinged shaft;

wherein the third hinged piece is disposed on the both side edges of the second panel and located below the second panel, the fourth hinged piece is disposed on the both side edges of the third panel and located on the third panel; and wherein the third hinged piece is configured perpendicular to the second panel and extending forwardly, the fourth hinged piece is configured perpendicular to the third panel and extending forwardly, and the third hinged piece and the fourth hinged piece are configured to be hinged via the second hinged shaft.

5. The multi-foldable clipboard according to claim 4, wherein the third hinged piece and the fourth hinged piece are configured with rounded corners on edges, the third hinged piece is configured with second hinged holes on an end of the third hinged piece away from the second panel, and the second hinged shaft is disposed in the second hinged holes.

6. The multi-foldable clipboard according to claim 1, wherein the third hinged part comprises a fifth hinged piece, a sixth hinged piece and a third hinged shaft;

the fifth hinged piece is disposed on the both side edges of the third panel and located below the third panel, the sixth hinged piece is disposed on both side edges of the fourth panel and located on the fourth panel; and the fifth hinged piece is configured perpendicular to the third panel and extending forwardly, the sixth hinged piece is configured perpendicular to the fourth panel and extending forwardly, and the fifth hinged piece is configured to be hinged with the six hinged piece via the third hinged shaft.

7. The multi-foldable clipboard according to claim 6, wherein the fifth hinged piece and the sixth hinged piece are configured with rounded corners on edges, the fifth hinged piece is configured with third hinged holes on an end of the fifth hinged piece away from the third panel, and the third hinged shaft is disposed in the third hinged holes.

* * * * *